United States Patent
Longdon et al.

(10) Patent No.: US 9,062,186 B2
(45) Date of Patent: Jun. 23, 2015

(54) BIO-RESINS

(75) Inventors: Tony Longdon, Swadlincote (GB); Paul William Law, Balsall Common (GB); Kevin Sillence, Fareham (GB); David John Wetters, High Peak (GB); Daniel Arnillas Perez, Southampton (GB)

(73) Assignee: Biome Bioplastics Limited (GB)

( * ) Notice: Subject to any disclaimer, the term of this patent is extended or adjusted under 35 U.S.C. 154(b) by 0 days.

(21) Appl. No.: 13/420,239

(22) Filed: Mar. 14, 2012

(65) Prior Publication Data

US 2012/0238673 A1 Sep. 20, 2012

(30) Foreign Application Priority Data

Mar. 14, 2011 (GB) ................................. 1104263.7

(51) Int. Cl.
*C08L 1/12* (2006.01)
(52) U.S. Cl.
CPC ............... *C08L 1/12* (2013.01); *C08L 2666/18* (2013.01); *C08L 2666/26* (2013.01)
(58) Field of Classification Search
CPC ................................... C08L 1/12; C08L 67/02
See application file for complete search history.

(56) References Cited

U.S. PATENT DOCUMENTS

| | | | |
|---|---|---|---|
| 3,892,821 A | 7/1975 | Koleske et al. | |
| 5,256,711 A * | 10/1993 | Tokiwa et al. | 524/47 |
| 5,292,783 A | 3/1994 | Buchanan et al. | |
| 2006/0045992 A1 | 3/2006 | Michihata et al. | |
| 2006/0160984 A1 | 7/2006 | Nagasawa et al. | |
| 2010/0192803 A1 | 8/2010 | Matsufiji et al. | |

FOREIGN PATENT DOCUMENTS

| | | |
|---|---|---|
| EP | 2241594 | 10/2010 |
| RU | 2146269 | 3/2000 |

OTHER PUBLICATIONS

Uesaka, T., et al., "Structure and Physical Properties of Cellulose Acetate/Poly(butylene succinate) Blends Containing a Transition Metal Alkoxide," J. App. Polymer Sci., 2002, 83, 1750-1758.*

* cited by examiner

*Primary Examiner* — Liam J Heincer
*Assistant Examiner* — Nicholas Hill
(74) *Attorney, Agent, or Firm* — Craig J. Lervick; Larkin Hoffman Daly & Lindgren, Ltd.

(57) ABSTRACT

A bio-resin composition contains cellulose acetate and a biodegradable secondary polymer in a ratio of at least 10:1 by weight of the total weight of the composition wherein the secondary polymer is an aliphatic polyester such as polybutylene succinate or an aliphatic co-polyester such as polybutylene succinate adipate or an aliphatic/aromatic polyester such as polybutylene adipate terephthalate. The secondary polymer may be present in an amount up to 10% by weight, more preferably up to 6% by weight and more preferably still in the range 2% to 3% by weight of the total weight of the composition where the combined amount of secondary polymer and cellulose acetate may be up to 85% of the total weight of the composition.

18 Claims, 1 Drawing Sheet

| | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Cellulose Acetate % by weight | 65.4 | 70.3 | 73.0 | 63.0 | 53.0 | 69.9 | 65.9 | 57.8 | 49.8 | 41.7 | 63.0 | 69.0 | 70.5 | 67.3 | 70.4 | 64.9 | 68.0 | 68.1 | 67.6 | 68.1 | 67.6 |
| Diethyl Phthalate % by weight | 15.7 | | | | | | | | | | | | | | | | 15.7 | | | | |
| Triacetin % by weight | | 13.0 | 10.0 | 20.0 | 30.0 | 17.1 | 16.1 | 14.1 | 12.15 | 10.2 | 20.0 | 14.2 | 12.9 | 16.2 | 13.0 | | 15.2 | 15.3 | 14.8 | 15.3 | 14.8 |
| PBAT (Ecoflex) % by weight | 5.5 | 2.6 | 2.6 | 2.6 | 2.6 | 2.6 | 2.6 | 2.5 | 2.5 | 2.5 | 2.5 | 2.7 | 2.5 | 2.5 | 2.5 | 5.6 | 2.75 | | | | |
| PBS % by weight | | | | | | | | | | | | | | | | | | 2.5 | 5.0 | | |
| PBSA % by weight | | | | | | | | | | | | | | | | | | | | 2.5 | 5.0 |
| Cellulose acetate : polymer | 11.9:1 | 27:1 | 28:1 | 24.2:1 | 20.4:1 | 26.9:1 | 25.3:1 | 23.1:1 | 19.9:1 | 16.7:1 | 25.2:1 | 25.5:1 | 28.2:1 | 26.9:1 | 28.1:1 | 11.6:1 | 24.7:1 | 27.2:1 | 13.5:1 | 27.2:1 | 13.5:1 |
| Cellulose acetate + polymer % by weight | 70.9 | 72.9 | 75.6 | 65.6 | 55.6 | 72.5 | 68.5 | 60.3 | 52.3 | 44.2 | 65.5 | 71.7 | 73.0 | 69.8 | 72.9 | 70.5 | 70.75 | 70.6 | 72.6 | 70.6 | 72.6 |
| Calcium Carbonate % by weight | 8.9 | 9.0 | | | | | | | | | | | | 8.9 | 8.9 | 8.9 | | | | | |
| Talc % by weight | | | 8.9 | 8.9 | 8.9 | 5.0 | 10.0 | 20.0 | 30.0 | 40.0 | 8.9 | 9.0 | 8.9 | | | | 9.0 | 9.0 | 8.5 | 9.0 | 8.5 |
| Titanium Dioxide % by weight | 2.0 | 2.0 | 2.5 | 2.5 | 2.5 | 2.4 | 2.4 | 2.5 | 2.5 | 2.5 | 2.5 | 2.5 | 2.5 | 2.5 | 2.5 | 2.5 | 2.5 | 2.5 | 2.0 | 2.5 | 2.0 |
| Lubricants % by weight | 2.5 | 3.1 | 3.0 | 3.0 | 3.0 | 3.0 | 3.0 | 3.1 | 3.1 | 3.1 | 3.1 | 2.6 | 2.6 | 2.7 | 2.7 | 2.4 | 2.5 | 2.6 | 2.1 | 2.6 | 2.1 |
| Flexural Modulus[1] Mpa | 2536 | 2892 | 4057 | 2424 | 1284 | 3068 | 3658 | 4652 | 5778 | 7548 | 2140 | 3726 | 3844 | 2536 | 2892 | 2582 | 3862 | 3467 | 3350 | 3317 | 3189 |
| Tensile strength[2] Mpa | 51.9 | 56.5 | 56.9 | 36.8 | 18.2 | 55.5 | 56.8 | 53.0 | 47.9 | 50.2 | 45.1 | 62.9 | 62.3 | 46.0 | 51.9 | 51.9 | 63.5 | 57.0 | 55.1 | 53.8 | 52.0 |
| Strain at break[2] % | 15.0 | 8.7 | 4.7 | 6.8 | 18.9 | 7.7 | 6.5 | 4.6 | 3.7 | 3.5 | 13.0 | 7.2 | 6.3 | 10.7 | 7.9 | 15.0 | 8.1 | 8.1 | 8.0 | 7.4 | 7.8 |
| Vicat A temperature[3] °C | 112 | 115 | 114 | 91 | 56 | 98 | 96 | 105 | 104 | 101 | 64 | 100 | 111 | 101 | 110 | 112 | | | | | |
| Melt flow index (g/10min@230°C, 5kg) | 22.1 | 9.3 | 6.5 | 22.6 | 23.5 | 24.4 | 17.0 | 24.8 | 12.7 | 8.1 | 28-30 | 18-20 | 10-12 | 12-14 | 12-14 | 28-30 | | | | | |

[1] - Flexural modulus values according to ISO 178:2001 Plastics- Determination of flexural properties.
[2] - Tensile strength and strain at break values according to ISO 527-1 Determination of tensile properties (General principles)
[3] - Vicat A values according to ISO 306:2004 Plastics - Thermoplastics materials determination of Vicat softening temperature (VST)

|  | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| Cellulose Acetate % by weight | 65.4 | 70.3 | 73.0 | 63.0 | 53.0 | 69.9 | 65.9 | 57.8 | 49.8 | 41.7 | 63.0 | 69.0 | 70.5 | 67.3 | 70.4 | 64.9 | 68.0 | 68.1 | 67.6 | 68.1 | 67.6 |
| Diethyl Phthalate % by weight | 15.7 |  |  |  |  |  |  |  |  |  |  |  |  |  |  | 15.7 |  |  |  |  |  |
| Triacetin % by weight |  | 13.0 | 10.0 | 20.0 | 30.0 | 17.1 | 16.1 | 14.1 | 12.15 | 10.2 | 20.0 | 14.2 | 12.9 | 16.2 | 13.0 |  | 15.2 | 15.3 | 14.8 | 15.3 | 14.8 |
| PBAT (Ecoflex) % by weight | 5.5 | 2.6 | 2.6 | 2.6 | 2.6 | 2.6 | 2.6 | 2.5 | 2.5 | 2.5 | 2.5 | 2.7 | 2.5 | 2.5 | 2.5 | 5.6 | 2.75 |  |  |  |  |
| PBS % by weight |  |  |  |  |  |  |  |  |  |  |  |  |  |  |  |  |  | 2.5 | 5.0 |  |  |
| PBSA % by weight |  |  |  |  |  |  |  |  |  |  |  |  |  |  |  |  |  |  |  | 2.5 | 5.0 |
| Cellulose acetate : polymer | 11.9:1 | 27.1 | 28:1 | 24.2:1 | 20.4:1 | 26.9:1 | 25.3:1 | 23.1:1 | 19.9:1 | 16.7:1 | 25.2:1 | 25.5:1 | 28.2:1 | 26.9:1 | 28.1:1 | 11.6:1 | 24.7:1 | 27.2:1 | 13.5:1 | 27.2:1 | 13.5:1 |
| Cellulose acetate + polymer % by weight | 70.9 | 72.9 | 75.6 | 65.6 | 55.6 | 72.5 | 68.5 | 60.3 | 52.3 | 44.2 | 65.5 | 71.7 | 73.0 | 69.8 | 72.9 | 70.5 | 70.75 | 70.6 | 72.6 | 70.6 | 72.6 |
| Calcium Carbonate % by weight | 8.9 | 9.0 |  |  |  |  |  |  |  |  |  |  |  |  |  | 8.9 |  |  |  |  |  |
| Talc % by weight |  |  | 8.9 | 8.9 | 8.9 | 5.0 | 10.0 | 20.0 | 30.0 | 40.0 | 8.9 | 9.0 | 8.9 | 8.9 | 8.9 |  | 9.0 | 9.0 | 8.5 | 9.0 | 8.5 |
| Titanium Dioxide % by weight | 2.0 | 2.0 | 2.5 | 2.5 | 2.5 | 2.4 | 2.4 | 2.5 | 2.5 | 2.5 | 2.5 | 2.5 | 2.5 | 2.5 | 2.5 | 2.5 | 2.5 | 2.5 | 2.0 | 2.5 | 2.0 |
| Lubricants % by weight | 2.5 | 3.1 | 3.0 | 3.0 | 3.0 | 3.0 | 3.0 | 3.1 | 3.1 | 3.1 | 3.1 | 2.6 | 2.6 | 2.7 | 2.7 | 2.4 | 2.5 | 2.6 | 2.1 | 2.6 | 2.1 |
| Flexural Modulus[1] Mpa | 2536 | 2892 | 4057 | 2424 | 1284 | 3068 | 3658 | 4652 | 5778 | 7548 | 2140 | 3726 | 3844 | 2536 | 2892 | 2582 | 3862 | 3467 | 3350 | 3317 | 3189 |
| Tensile strength[2] Mpa | 51.9 | 56.5 | 56.9 | 36.8 | 18.2 | 55.5 | 56.8 | 53.0 | 47.9 | 50.2 | 45.1 | 62.9 | 62.3 | 46.0 | 51.9 | 51.9 | 63.5 | 57.0 | 55.1 | 53.8 | 52.0 |
| Strain at break[2] % | 15.0 | 8.7 | 4.7 | 6.8 | 18.9 | 7.7 | 6.5 | 4.6 | 3.7 | 3.5 | 13.0 | 7.2 | 6.3 | 10.7 | 7.9 | 15.0 | 8.1 | 8.1 | 8.0 | 7.4 | 7.8 |
| Vicat A temperature[3] °C | 112 | 115 | 114 | 91 | 56 | 98 | 96 | 105 | 104 | 101 | 64 | 100 | 111 | 101 | 110 | 112 |  |  |  |  |  |
| Melt flow index (g/10min@230°C, 5kg) | 22.1 | 9.3 | 6.5 | 22.6 | 23.5 | 24.4 | 17.0 | 24.8 | 12.7 | 8.1 | 28-30 | 18-20 | 10-12 | 12-14 | 12-14 | 28-30 |  |  |  |  |  |

[1] - Flexural modulus values according to ISO 178:2001 Plastics- Determination of flexural properties.
[2] - Tensile strength and strain at break values according to ISO 527-1 Determination of tensile properties (General principles)
[3] - Vicat A values according to ISO 306:2004 Plastics - Thermoplastics materials determination of Vicat softening temperature (VST)

BIO-RESINS

FIELD

The present invention relates to bio-resins and in particular to bio-resin compositions containing a blend of polymers, the preparation thereof and the use thereof as biodegradable materials for various applications. More especially, the present invention concerns bio-resin compositions containing a blend of polymers including cellulose acetate, preferably, but not exclusively, cellulose diacetate.

BACKGROUND

Recent years have seen an accelerating trend in the commercial use of bio-resins across a wide range of products. This growth has been driven by a range of factors. With the petrochemical based polymers likely to be more limited and expensive in coming years, the availability of materials based on sustainable, renewable resources is a key factor. For disposable products such as packaging ease of disposal via a composting route is another important advantage over traditional materials.

One limitation with so-called bio-resins is the relatively low temperature performance of these materials. For instance polylactic acid (PLA) is a widely available biopolymer, but in its amorphous form it has a glass transition temperature (Tg) around 58° C., and softens and shows poor form retention above this temperature. Although the temperature performance can be improved by crystallizing the polymer, attempts to carry this out commercially have met with very limited success.

Another limitation is the processing performance of these materials. For example cellulose acetate is produced by reacting acetic anhydride with cellulose. The resulting polymer is quite rigid and shows good stiffness and strength, but is relatively difficult to process. It can be processed in solution (e.g. with acetone) or by adding plasticisers to soften the polymer and allow melt processing by e.g. injection moulding and sheet extrusion. Whilst such technologies are well known, the addition of too much plasticiser can reduce the mechanical properties of the final product, especially at higher temperatures, as well as reducing the glass transition temperature. On the other hand too little plasticiser leads to low melt flow and difficulties in processing.

SUMMARY

The present invention seeks to address the shortcomings aforementioned.

It is a desired aim of the present invention to provide a bio-resin composition wherein physical properties and processability are optimised.

In its broadest aspect, the present invention provides a bio-resin composition containing a blend of polymers including cellulose acetate and a biodegradable secondary polymer.

In one preferred embodiment the cellulose acetate and biodegradable secondary polymer are present in a combined amount of up to 85% by weight of the total weight of the composition, preferably in the range 40% to 85% by weight of the total weight of the composition.

The biodegradable secondary polymer may be selected from the group comprising biodegradable aliphatic, aromatic and aliphatic/aromatic polyesters and mixtures thereof.

The biodegradable polyesters may be present in an amount up to 6% by weight, more preferably up to 3% by weight. It may be that the biodegradable polyesters are present in an amount from 2% by weight of the total weight of the composition. Most preferably the biodegradable polyesters are present in the range 2% to 3% by weight of the total weight of the composition.

The ratio of cellulose acetate to biodegradable polyester may be at least 10:1 and more preferably at least 20:1, possibly at least 25:1.

Suitable biodegradable polyesters may be a copolymer based on a diol and one or more aliphatic and/or aromatic dicarboxylic acids and derivatives thereof. Preferred diols are butane diols such as butane 1, 4 diol and preferred aliphatic dicarboxylic acids include succinic acid and adipic acid and preferred aromatic dicarboxylic acids include terephthalic acid.

Examples of suitable biodegradable secondary polymers materials include polyhydroxyalkanoates such as polyhydroxybutyrate (PHB) and polyhyroxybutyrate valerate (PHBV), polycaprolactone (PCL), polylactic acid (PLA), polybutylene succinate (PBS), polybutylene succinate adipate (PBSA), and polybutylene adipate terephthalate (PBAT) and derivatives of any of these.

Compositions according to the invention may offer enhanced flow and melt strength characteristics by virtue of the biodegradable secondary polymer(s) contained within the blend. Surprisingly it has been found that relatively small amounts of the biodegradable secondary polymer(s) may improve flow at lower plasticiser levels and can enhance melt strength for processing where the polymer blend undergoes elongation e.g. thermoforming or blow moulding, without compromising other properties of the bio-resin composition, in particular temperature resistance and bio-degradability of products made from bio-resin compositions according to the invention.

More especially, branched aliphatic/aromatic co-polyesters such as polybutylene adipate co-terephalate sold by BASF under the name Ecoflex (registered trade mark of BASF) have been found to impart a good combination of flow and melt strength into the final polymer.

The cellulose acetate may be cellulose triacetate or more preferably cellulose diacetate. The cellulose acetate may have a degree of substitution (DS) in the range 2.0-3.0, and most preferably in the range 2.35-2.65 although this is not limiting on the scope of the invention. The cellulose acetate may be derived from natural woodpulp or cotton linters.

The composition may contain at least 40% (+/−1%) by weight of the total weight of the composition of cellulose acetate, more preferably at least 50% (+/−1%) by weight and more preferably still at least 60% (+/−1%) by weight. It may be that the cellulose acetate is present in an amount up to 80% (+/−1%) by weight of the total weight of the composition. Preferably the cellulose acetate is present in the range 40% to 80% (+/−1%) by weight, more preferably in the range 50% to 75% (+\−1%) by weight and most preferably in the range 60% to 75% (+\−1%) by weight.

In another preferred embodiment the composition may contain at least 60% by weight cellulose acetate and up to 6% by weight biodegradable secondary polymer. The combined amount of cellulose acetate and biodegradable secondary polymer may be up to 85% by weight of the total weight of the composition. The biodegradable polyester may be present an amount up to 3% by weight. It may be that the biodegradable polyesters are present in an amount from 2% by weight of the total weight of the composition. Most preferably the biodegradable polyesters are present in the range 2% to 3% by weight of the total weight of the composition. The cellulose acetate may be present in an amount up to 80% by weight of the total weight of the composition, more preferably in the range 60% to 75% by weight of the total weight of the composition. The ratio of cellulose acetate to biodegradable secondary polymer may be at least 10:1 and more preferably at least 20:1, possibly at least 25:1. The biodegradable secondary polymers may comprise any of the polymers described previously.

In yet another preferred embodiment the composition may contain cellulose acetate and a biodegradable secondary polymer wherein the ratio of cellulose acetate to biodegradable secondary polymer may be at least 10:1 and more preferably at least 20:1, possibly at least 25:1. The combined amount of cellulose acetate and biodegradable secondary polymer may be up to 85% by weight of the total weight of the composition, and preferably at least 40% by weight of the total weight of the composition. The composition may contain cellulose acetate in an amount from 40% by weight of the total weight of the composition, more preferably at least 50% by weight and more preferably still at least 60% by weight. It may be that the cellulose acetate is present in an amount up to 80% by weight of the total weight of the composition, more typically up to 75%. Preferably the cellulose acetate is present in the range 60% to 75% by weight of the total weight of the composition. The biodegradable secondary polymer may be present in an amount up to 6% by weight, more preferably up to 3% by weight. It may be that the biodegradable polyesters are present in an amount from 2% by weight of the total weight of the composition. Most preferably the biodegradable polyesters are present in the range 2% to 3% by weight of the total weight of the composition. The biodegradable secondary polymers may comprise any of the polymers described previously.

In a still further preferred embodiment the bio resin composition may contain cellulose acetate and at least one biodegradable polyester or co-polyester selected from the group comprising polybutlyene succinate, polybutylene succinate adipate, and polybutylene adipate terephthalate and derivatives thereof wherein the biodegradable polyester or co-polyester is present in an amount up to 10% by weight of the total weight of the composition. The composition may contain cellulose acetate in an amount from 40% by weight of the total weight of the composition, more preferably at least 50% by weight and more preferably still at least 60% by weight. It may be that the cellulose acetate is present in an amount up to 80% by weight of the total weight of the composition, more preferably up to 75% by weight. Preferably the cellulose acetate is present in the range 60% to 75% by weight of the total weight of the composition. The combined amount of cellulose acetate and biodegradable polyester or co-polyester may be up to 85% by weight of the total weight of the composition and preferably at least 40% by weight of the total weight of the composition. The ratio of cellulose acetate to biodegradable polyester or co-polyester may be at least 10:1 and more preferably at least 20:1, possibly at least 25:1. The biodegradable polyester or co-polyester may be present in an amount up to 6% by weight, more preferably up to 3% by weight. It may be that the biodegradable polyesters are present in an amount from 2% by weight of the total weight of the composition. Most preferably the biodegradable polyesters are present in the range 2% to 3% by weight of the total weight of the composition.

Compositions according to the invention are preferably compounded with a range of additives for specific functionality, including but not limited to, one or more of plasticisers, fillers, pigments and dyes, optical brightening agents, stabilisers, anti-block and anti-static additives, lubricants and UV light and heat stabilisers.

Such additional ingredients may enhance performance or appearance of the composition. For example, compositions with such additional ingredients may show a combination of good temperature performance whilst giving good melt processing characteristics.

Plasticisers may be added for processing the composition via a range of thermoplastic processing routes including but not limited to injection moulding, blow moulding, sheet extrusion, thermoforming and even film blowing. Pigments or dyes may be added for colouring and may either be added directly or by means of a masterbatch. Anti-block and slip aids may be added to adjust the surface characteristics of any moulding produced from the material. UV, heat or other stabilisers may be added to control the (bio)degradation of the resin blend in processing and in end use.

Suitable plasticisers include one or more of glycerol triacetate (triacetin), glycerol diacetate (diacetin), triphenyl phosphate, tricresyl phosphate, diethyl phthalate, dimethyl phthalate, polyethylene glycol, triethyl citrate, diethyl citrate, ethyl lactate. This list is not exhaustive and other plasticisers may be employed. Where provided the plasticiser(s) is/are present in an amount up to 30% (+\−1%) by weight of the total weight of the composition, more preferably in range 5% to 25% (+\−1%) by weight and most preferably in the range 10% to 20% (+\−1%) by weight.

Suitable fillers include, but are not limited to, calcium carbonate, talc and fibre(s). Where provided, the filler(s) is/are present in an amount up to 45% (+\−1%) by weight of the total weight of the composition, more preferably in the range 5% to 40% (+\−1%) by weight and most preferably in the range 5% to 10% (+\−1%) by weight.

Compositions according to the invention can be formulated to offer bio-resins with Vicat A softening temperatures above 60° C. and more particularly up to and in excess of 100° C.

Preferred compositions according to the invention have a Vicat A softening temperature of at least 70° C. with preferred compositions having a Vicat A softening temperature in the range 70° C.-120° C., and most preferably in the range 100° C.-120° C. although this is not limiting on the scope of the invention and compositions having a Vicat A softening temperature higher than 120° C. may be provided for some applications.

Factors in determining the temperature performance may include the type and amount of plasticiser, and the type and amount of secondary polymer chosen, and the cellulose acetate properties (molecular weight, molecular weight distribution and degree of substitution).

Compositions according to the invention can be formulated to offer bio-resins with a Melt Flow Index (MFI) up to 40 g/10 min@230° C., 5 kg and more particularly up to 30 g/10 min@230° C., 5 kg.

Preferred compositions according to the invention have an MFI in the range 10 to 40 g/10 min@230° C., 5 kg although this is not limiting on the scope of the invention and compositions having an MFI outside this range may be provided for some applications.

Compositions according to the invention can be formulated to offer bio-resins with a flexural modulus as determined in accordance with ISO 178 up to 8000 Mpa and more particularly up to 4000 Mpa.

Preferred compositions according to the invention have a flexural modulus in the range 2000 to 4000 Mpa although this is not limiting on the scope of the invention and compositions having a flexural modulus outside this range may be provided for some applications.

Compositions according to the invention can be formulated to offer bio-resins with a tensile strength as determined in accordance with ISO 527 up to 80 Mpa and more particularly up to 70 Mpa.

Preferred compositions according to the invention have a tensile strength in the range 10 to 70 Mpa, more preferably in the range 35 to 70 Mpa and most preferably in the range 45 to 65 Mpa although this is not limiting on the scope of the invention and compositions having a tensile strength outside this range may be provided for some applications.

Compositions according to the invention can be formulated to offer bio-resins with a strain at break as determined in accordance with ISO 527 up to 25% and more particularly up to 20%.

Preferred compositions according to the invention have a strain at break in the range 2 to 20%, more preferably in the range 5 to 20% and most preferably in the range 5 to 15% although this is not limiting on the scope of the invention and compositions having a strain at break outside this range may be provided for some applications.

Compositions according to the invention may be suitable for use across a wide range of applications, especially those where a higher level of temperature performance is required. At least some compositions may be suitable for direct food contact use while any compositions that are not be suitable for direct food contact use can be used for technical applications.

Compositions according to the invention are biodegradable and may also be compostable according to EN13432 and ASTM D6400.

Compositions according to the invention may be suitable for thermoplastic conversion in processes such as injection moulding, sheet extrusion, thermoforming, and film blowing. Components made via these processes may show improved temperature performance compared with typical bio-resin compounds, are biodegradable and can, if desired, be formulated to be suitable for food contact applications.

Compositions according to the invention may include one or more additional tertiary polymers to adjust the flow and performance characteristics of the final composition. Such tertiary polymers may include one or more of polyhydroxy alkanoates (PHAs), or polyamides.

EXAMPLES

FIG. 1 is a table of compositions according to the invention. The constituent materials may be blended together in the desired ratios and compounded on a standard twin screw extruder. Various properties of the resulting bio-resins were tested and FIG. 1 includes values of flexural modulus, tensile strength, strain at break, Vicat A temperature and melt flow index. We have found that the relatively small amounts of the biodegradable secondary polymer(s) present in the compositions according to the invention can improve flow at lower plasticiser levels and can enhance melt strength for processing where the polymer blend undergoes elongation e.g. thermoforming or blow moulding, without compromising mechanical and thermal properties of the bio-resin compositions while maintaining bio-degradability of products made from bio-resin compositions.

Compositions according to the invention may be used for a wide range of applications, including but not exclusively:
  Injection moulded cutlery and tableware offering a biodegradable/compostable disposal option and/or a material with a high level of environmentally renewable content.
  Electronic or electrical housings or components which may be produced via injection moulding and or sheet extrusion and thermoforming/pressing. More generally the resin may be used for any general application where a good level of temperature resistance is required. The resin offers good temperature performance with a high renewable content.
  Extruded sheet which allows the thermoforming of for example trays for food and other materials and cup lids for hot and cold beverages.
  Blow moulded items, e.g. bottles, and rigid tubes.
  Automotive parts where there will generally be a need for temperature resistance.
  More generally, a wide range of thermoplastically processed products.

While the invention has been described with reference to preferred examples, it will be understood that the invention is not limited thereto and that modifications may be made without departing from the spirit and scope of the invention described herein.

We claim:

1. A bio-resin composition containing a blend of polymers including cellulose diacetate and a biodegradable secondary polymer wherein the ratio of cellulose diacetate to biodegradable secondary polymer is at least 20:1 with the combined amount of cellulose diacetate and biodegradable secondary polymer being up to 85% by weight of the total weight of the composition, wherein the secondary polymer provides the bio-resin composition with increased melt strength without substantially reducing softening temperature relative to a cellulose diacetate composition without a secondary polymer, wherein the biodegradable secondary polymer is selected from the group comprising aliphatic, aromatic and mixed aliphatic/aromatic polyesters, and the composition further including at least one plasticiser and at least one lubricant, the plasticiser being present in an amount in the range 5% to 25% by weight of the total weight of the composition.

2. The composition according to claim 1 wherein the biodegradable secondary polymer is polybutylene adipate terephthalate.

3. The composition according to claim 1 wherein the cellulose diacetate is present in the range 40% to 80% by weight of the total weight of the composition.

4. The composition according to claim 3 wherein the cellulose diacetate is present in the range 50% to 75% by weight of the total weight of the composition.

5. The composition according to claim 4 wherein the cellulose diacetate is present in the range 60% to 75% by weight of the total weight of the composition.

6. The composition according to claim 1 wherein the biodegradable secondary polymer is present in an amount up to 3% by weight of the total weight of the composition.

7. The composition according to claim 6 wherein the biodegradable secondary polymer is present in the range 2% to 3% by weight of the total weight of the composition.

8. The composition according to claim 1 further containing one or more fillers in an amount up to 45% by weight of the total weight of the composition.

9. The composition according to claim 1 having a Vicat softening temperatures above 60° C.

10. The composition according to claim 9 having a Vicat softening temperature in the range 70° C.-120° C.

11. The composition according to claim 1 that is compostable according to ASTM D6400.

12. The composition according to claim 1 wherein the biodegradable secondary polymer is a branched aliphatic/aromatic polyester copolymer.

13. A bio-resin composition containing a blend of polymers including cellulose diacetate and a biodegradable secondary polymer wherein the biodegradable secondary polymer is present in an amount in the range 2% to 3% by weight of the total weight of the composition with the combined amount of cellulose diacetate and biodegradable secondary polymer being in the range 60% to 75% by weight of the total weight of the composition, wherein the biodegradable secondary polymer is selected from the group comprising aliphatic, aromatic and mixed aliphatic/aromatic polyesters and the ratio of cellulose diacetate to biodegradable secondary polymer is at least 20:1, and the composition further contains at least one plasticiser, at least one filler and at least one lubricant.

14. The composition according to claim 13 wherein the biodegradable secondary polymer is a branched aliphatic/aromatic polyester copolymer.

15. The composition according to claim 13 wherein the biodegradable secondary polymer is polybutylene adipate terephthalate.

16. A bio-resin composition containing a blend of polymers including cellulose diacetate and a biodegradable secondary polymer wherein the biodegradable secondary polymer is present in an amount up to 3% by weight of the total weight of the composition with the combined amount of cellulose diacetate and biodegradable secondary polymer being up to 85% by weight of the total weight of the composition, wherein the secondary polymer provides the bio-resin composition with increased melt strength without substantially reducing softening temperature relative to a cellulose diacetate composition without a secondary polymer, wherein the biodegradable secondary polymer is selected from the group comprising aliphatic, aromatic and mixed aliphatic/aromatic polyesters and the ratio of cellulose diacetate to biodegradable secondary polymer is at least 10:1, and the composition further including at least one plasticiser and at least one lubricant, the plasticiser being present in an amount in the range 5% to 25% by weight of the total weight of the composition.

17. The composition according to claim 16 wherein the biodegradable secondary polymer is a branched aliphatic/aromatic polyester copolymer.

18. The composition according to claim 16 wherein the biodegradable secondary polymer is polybutylene adipate terephthalate.

* * * * *